(12) United States Patent
Milliner et al.

(10) Patent No.: US 8,346,175 B2
(45) Date of Patent: Jan. 1, 2013

(54) WIRELESS SIGNAL DETECTION USING A TRANSFORMED LATTICE BOUNDARY

(75) Inventors: David L. Milliner, New Orleans, LA (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1051 days.

(21) Appl. No.: 12/022,652

(22) Filed: Jan. 30, 2008

(65) Prior Publication Data

US 2008/0182521 A1 Jul. 31, 2008

Related U.S. Application Data

(60) Provisional application No. 60/887,271, filed on Jan. 30, 2007.

(51) Int. Cl.
*H04B 17/00* (2006.01)
(52) U.S. Cl. ............... 455/67.11; 455/67.13; 455/63.1; 455/67.16
(58) Field of Classification Search ............... 455/67.11, 455/67.13, 63.1
See application file for complete search history.

(56) References Cited

U.S. PATENT DOCUMENTS

| | | | | |
|---|---|---|---|---|
| 5,497,384 | A * | 3/1996 | Fredrickson et al. | 714/792 |
| 5,548,600 | A * | 8/1996 | Fredrickson et al. | 714/792 |
| 5,555,692 | A * | 9/1996 | Griffith | 52/662 |
| 7,233,934 | B1 | 6/2007 | Oggerino et al. | |
| 2005/0063493 | A1 * | 3/2005 | Foster | 375/329 |

OTHER PUBLICATIONS

Kai-Kit Wong; Paulraj, A.; "On the decoding order of MIMO maximum-likelihood sphere decoder: linear and non-linear receivers", Vehicular Technology Conference. VTC 2004-Spring. 2004 IEEE 59th, vol. 2; pp. 698-702.*
Chan, A.M.; Inkyu Lee; "A new Reduced-complexity Sphere Decode for Multiple antenna system", Communications, ICC 2002. IEEE International Conference on, vol. 1, pp. 460-464.*
Bertozzi, T.; Le Ruyet, D.; "Iterative detection in MIMO channels using particle filtering" Communications, 2004 IEEE International Conference on vol. 5, pp. 2694-2698.*
Radosavljevic, P.; Cavallaro, J.R.; "Soft Sphere Detection with Bounded Search for High-Throughput MIMO Receivers" Signals, Systems and Computers. ACSSC '06. Fortieth Asilomar Conference on 2006, pp. 1175-1179.*
Barry, J. R. et al., Digital Communications, 3rd Ed; 2004; pp. 517-521; Chapter 10; Kluwer Academic Publishers.
Chan A. and Lee, I, "A New Reduced-Complexity Sphere Decoder for Multiple Antenna Systems," IEEE Conference on Communications, 2002, pp. 460-464.
Damen, M. O. et al., "On Maximum-Likelihood Detection and the Search for the Closest Lattice Point," IEEE Trans on Info. Theory; Oct. 2003; pp. 2389-2402; vol. 49, No. 10.
Foschini, G. J. et al.; "Simplified Processing for Wireless Communication at High Spectral Efficiency," IEEE J. Selected Areas in Communication; 1999; pp. 1841-1852; vol. 17, No. 11.

(Continued)

*Primary Examiner* — Matthew Anderson
*Assistant Examiner* — Ganiyu A Hanidu
(74) *Attorney, Agent, or Firm* — Steven A. Shaw; W. James Brady; Frederick J. Telecky, Jr.

(57) ABSTRACT

In at least some embodiments, a wireless communication system includes a transmitter that transmits a signal over a communication channel. The system also includes a receiver that receives the signal as an output of the communication channel. The receiver establishes a boundary for a transformed lattice and eliminates candidates outside the established boundary.

14 Claims, 4 Drawing Sheets

OTHER PUBLICATIONS

Hochwald, B. M. and ten Brink S.; "Achieving Near-Capacity on a Multiple-Antenna Channel," IEEE Trans. on Comm.; Mar. 2003; pp. 389-399; vol. 51, No. 3.

Waters, D. W.; "Signal Detection Strategies and Algorithms for Multiple-Input Multiple-Output Channels;" Georgia Institute of Technology; PhD Dissertation; Dec 2005; available at http/etd.gatech.edu.

Wubben, D. et al.; "Near-Maximum-Likelihood Detection and Precoding for MIMO Systems Using Lattice Reduction," IEEE Information Theory Workshop, Jun. 2004; pp. 345-348.

Zhao, W. and Giannakis, G. B.; "Sphere Decoding Algorithms with Improved Radius Search," IEEE Communications and Networking Conference; Mar. 2004; pp. 2290-2294, vol. 4.

Schnorr, C. P. and Euchner, M.; "Lattice Basis Reduction: Improved Practical Algorithms and Solving Subset Sum Problems," Math Programming, 1994, pp. 181-191, vol. 66.

Wubben, D. et al., "Efficient Algorithm for Decoding Layered Space-Time Codes;" Electronic Letters; Oct. 2001; pp. 1348-1350, vol. 37, No. 22.

\* cited by examiner

WIRELESS SIGNAL DETECTION USING A TRANSFORMED LATTICE BOUNDARY

CROSS-REFERENCE TO RELATED APPLICATIONS

This application is a non-provisional application claiming priority to U.S. Pat. App. Ser. No. 60/887,271, entitled "Hypercube Bounding Over Lattice Searching Background", filed on Jan. 30, 2007. The above-referenced application is incorporated herein by reference.

FIELD OF THE INVENTION

The present disclosure is directed to communication systems, and more particularly, but not by way of limitation, to lattice-reduction-aided (LR-aided) communication systems.

BACKGROUND

When using linear transformation in communication systems a typical operation is an equalization step. For example, the zero forcing equalizer takes the channel matrix H and inverts it in order to perform detection. Other equalizers include the minimum mean square error equalizer and successive interference cancellation. All of these equalizers can be combined with other processing such as lattice-reduction in order to perform detection. Methods and systems that reduce detection complexity are desirable.

SUMMARY

In at least some embodiments, a wireless communication system comprises a transmitter that transmits a signal over a communication channel. The system also comprises a receiver that receives the signal as an output of the communication channel. The receiver establishes a boundary for a transformed lattice and eliminates candidates outside the established boundary.

In at least some embodiments, an electronic device comprises a processor and a receiver coupled to the processor. The receiver checks whether received candidate points are within a transformed lattice boundary.

In at least some embodiments, a method for wireless signal detection comprises identifying a boundary for a transformed lattice. The method further comprises eliminating candidates outside the boundary.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the disclosure define a boundary for a translated lattice. In at least some embodiments, the boundary is formed by tracking corner or edge elements of a lattice before and after translation (before the translation, the lattice elements represent the transmitted constellation). The boundary is used to identify whether translated lattice elements (sometimes called "entries", "points", or "candidates") are within a valid search space. Translated lattice entries outside the boundary are eliminated as possible candidates. Defining a boundary and identifying whether translated lattice entries are within a valid search space can reduce complexity of wireless signal detection.

Figure 1:
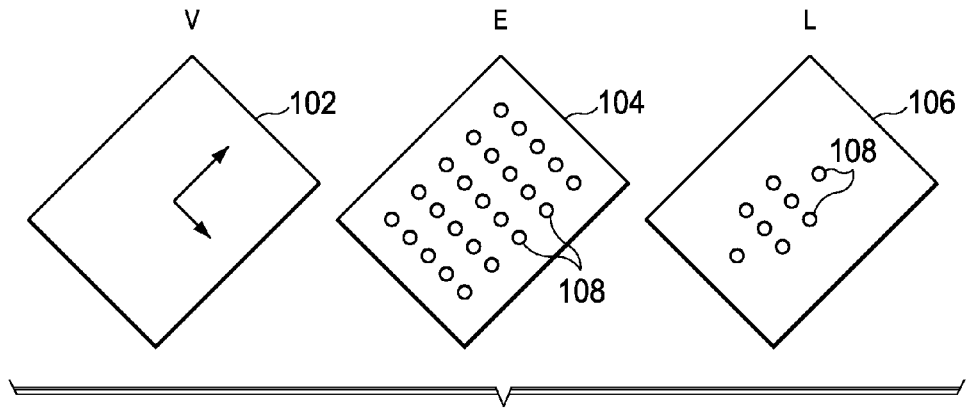
FIG. 1 illustrates an integer lattice-based list in accordance with embodiments of the disclosure.

FIG. 1 illustrates an integer lattice-based list in accordance with embodiments of the disclosure. In FIG. 1, a definition of an integer lattice is provided as well as a description of how a linear transformation affects a geometric shape. An integer lattice in the real vector space $R^n$ is a discrete subgroup of the space $R^n$ spanning the real vector space $R^n$. Integer lattices in $R^n$ can be generated from a basis for the space by creating all linear combinations of the basis with integer coefficients, where the lattice elements are regularly spaced. In FIG. 1, V 102 represents $V=[v_1\ v_2]$ and is the basis used to generate an integer lattice E 104 having elements 108. The integer lattice E 104 represents $E=\{m\bar{v}_1+n\bar{v}_2|m=\pm 1, \pm 2, \ldots \pm c; n=\pm 1, \pm 2, \ldots, \pm c\}$ and is the linear combination of basis vectors $v_1$ and $v_2$ for integer coefficients $-2, -1, 0, 1,$ and $2$. The list L 106 represents $L \subset E, c=2$ and is a subset of the integer lattice E 104, where $c=2$. In at least some embodiments, determining a list such as L involves defining a boundary for a translated integer lattice and identifying whether translated integer lattice entries are within a valid search space. Although the embodiments described herein involve an integer lattice, alternative embodiments may involve a floating point lattice, which requires higher complexity to process.

Figure 2:
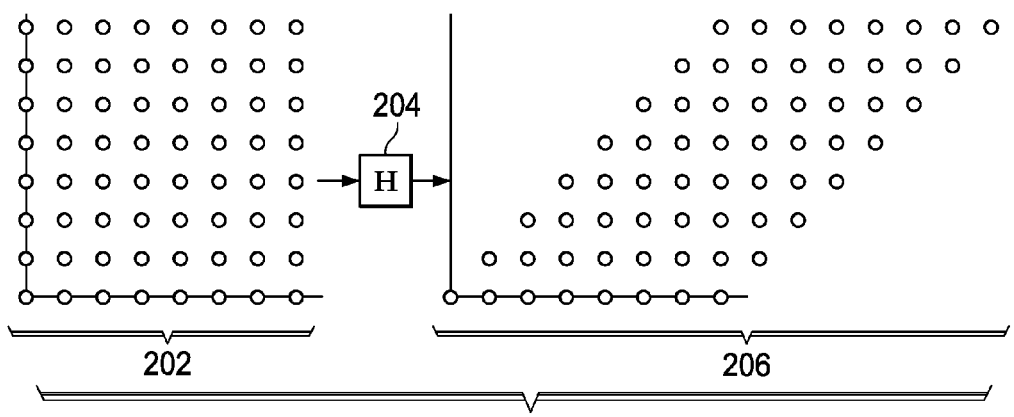
FIG. 2 illustrates a linear transformation on a lattice in accordance with embodiments of the disclosure.

FIG. 2 illustrates a linear transformation on a lattice in accordance with embodiments of the disclosure. The transformation shown in FIG. 2 is illustrated in two dimensions, but the same concept extends to higher dimensions as well. In FIG. 2, a square lattice 202 is passed though a matrix H 204 (i.e., by multiplication). The matrix multiplication is nothing more than a linear transformation and is, geometrically, just a stretching and squeezing of one shape into another.

As shown, the stretching and squeezing of the square lattice 202 results in a parallelogram lattice 206. Similarly, in two dimensions a linear transformation on a circle produces an ellipse. The same concept extends to higher dimensions. For example, in three dimensions a sphere becomes an ellipsoid. In dimensions four and above, a hypersphere becomes a hyperellipsoid. Also, in dimensions four and above, a hyperparallelopiped becomes another hyperparallelopiped even though the two objects are transformations of one another.

In a communication system, various lattice shapes such as those described herein may represent transmitted data. In at least some embodiments, the geometry of a translated lattice is used to place bounds on the search space. In this manner, search operations are only performed within a bounded and finite geometry formed via a translation of the input finite lattice.

Figure 3:
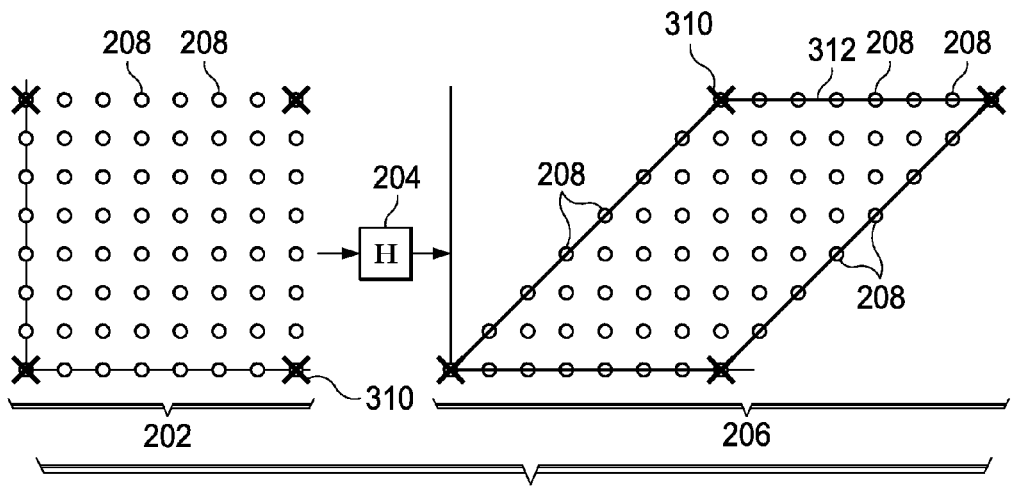
FIG. 3 illustrates a bounding operation for the lattice of FIG. 2 in accordance with embodiments of the disclosure.

FIG. 3 illustrates a bounding operation for the lattice 202 of FIG. 2 in accordance with embodiments of the disclosure. In FIG. 2, the lattice 202 is an example of a standard square quadrature-amplitude modulated (QAM) alphabet having a plurality of elements 208, including four boundary elements 310 (shown by "X"). For the square lattice 202, the boundary elements 310 are located at each corner. In alternative embodiments, lattices could be another two-dimensional shape (e.g., a rectangle, circle or ellipse) or a higher-dimensional shape (e.g., a sphere, an ellipsoid, a hypersphere, a hyperellipsoid, or a hyperparallelopiped). In such cases, additional or fewer boundary elements 310 may be used. In the case of circles, ellipses or other curved lattice surfaces, boundary elements 310 may define a curve rather than a corner.

In FIG. 3, the boundary element 310 at the bottom left corner of the lattice 202 is at the origin. After passing through a linear transformation (i.e., the matrix H) 204, the lattice 202 has been transformed into the lattice 206. As shown, the corner elements 310 of the lattice 202 remain the corner elements 310 of the transformed lattice 206. In at least some embodiments, this result is due to defining the integer alphabet such that one of the corner elements 308 is at the origin. Because the corner elements 310 are known, boundary lines 312 can be determined. Subsequently, elements 208 in the transformed space can be compared to the boundary lines 312 to determine whether or not elements 208 are within the boundary lines 312. As shown, some elements may be outside the boundary lines 312 and can thus be eliminated as candidates. The same boundary concept extends to higher dimensions and prevents searches outside of the lattice. For simplicity, the lattice 202 may be constrained to the $1^{st}$ quadrant and may be composed only of integer elements. However, alternative embodiments may vary with respect to quadrant location and/or with respect to composition (i.e., integer or non-integer elements).

Figure 4:
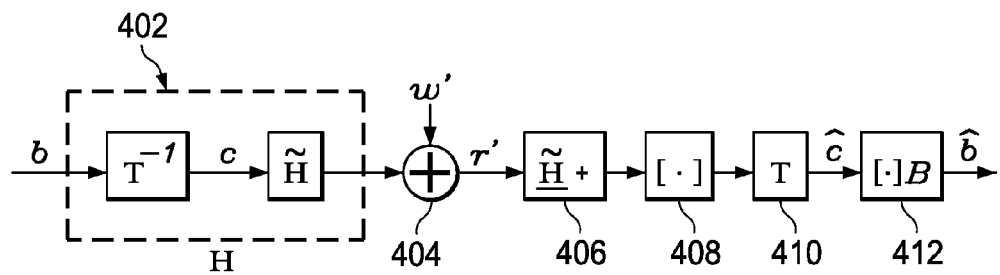
FIG. 4 illustrates an Minimum Mean-Squared Error (MMSE) Lattice-Reduction-Aided (LR-aided) Multiple-Input Multiple-Output (MIMO) detector in accordance with embodiments of the disclosure.

FIG. 4 illustrates a MMSE LR-aided Multiple-Input Multiple-Output (MIMO) detector 400 in accordance with embodiments of the disclosure. An LR-aided detector such as detector 400 operates in three steps. First, the detector 400 performs lattice reduction to find a reduced basis $\tilde{H}=HT$ in block 402. As used herein, T refers to a unimodular matrix having integer entries, where the absolute value of T's determinant is 1. Second, the detector 400 adapts the viewpoint $r'=\tilde{H}c+\omega'$ by adding the output of block 402 with $\omega'$ (using adder 404) and implements a low-complexity MIMO detector (e.g., a linear or decision-feedback detector) to recover c. As used herein, c refers to a shifted and scaled version of the channel input. In FIG. 4, blocks 406, 408 and 410 represent a technique for estimating c as $\hat{c}_{LR\text{-}MMSE}=[\underline{\tilde{H}}^+\underline{r}']$, where $$\underline{\tilde{H}} = \begin{bmatrix} H \\ \sigma I \end{bmatrix} T, \underline{r}' = [r'^T, 0]^T \text{ and } [\cdot]$$

denotes a component-wise rounding to integers. In at least some embodiments, estimating $\hat{c}$ involves performing the lattice bounding operation and eliminating candidates outside the boundary as described herein. Third, the detector 400 recovers the inputs to the original channel using the relationship b=Tc in block 412. In FIG. 4, b is estimated as $\hat{b}=[T\hat{c}]_B$, where $[\bullet]_B$ denotes a component-wise rounding to the nearest element of B.

When performing LR-aided detection, a common approach is to pass a $1^{st}$ quadrant alphabet through a linear transformation and additive noise, where detection in the translated space is performed by rounding to the nearest integer as described for FIG. 4. Unfortunately, detection at this stage cannot guarantee that the estimated symbol truly corresponds to a point in the original lattice. To verify that the estimated symbol corresponds to a point in the original lattice, the estimate is passed back through the inverse transformation which is yet another matrix multiplication. Then the estimate is compared to the transmitted alphabet adding further complexity.

With the lattice bounding operation, the number of matrix multiplications can be reduced from two to one. Further, the need for taking the matrix inverse is eliminated for translated elements that are outside the boundary. In other words, establishing boundaries in the received space (after linear transformation) enables a comparison of received points against the lines of the bounded lattice. One way to perform the boundary check is to determine whether a candidate is on the interior of each boundary line (e.g., the lines 312). If a candidate is outside the established boundaries, the candidate is presumed to be invalid and the inverse transformation and comparison (to the original lattice) steps described previously can be omitted. Alternatively, if a candidate is within the established boundaries, the inverse transformation and comparison steps can be performed to guarantee the candidate truly corresponds to a point in the original lattice.

Figure 5:
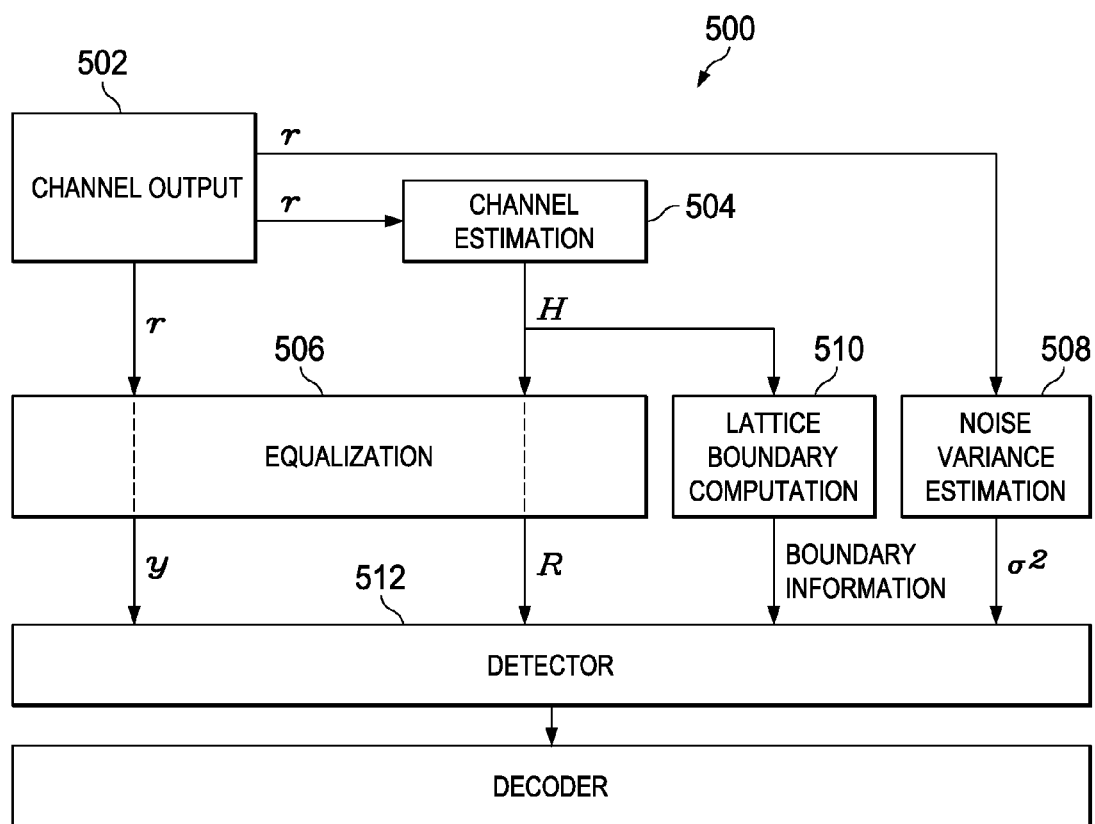
FIG. 5 shows a block diagram of a receiver in accordance with embodiments of the disclosure.

FIG. 5 shows a block diagram of a receiver 500 in accordance with embodiments of the disclosure. In FIG. 5, the channel output block 502 represents an incoming signal from a channel (e.g., a MIMO channel). In some embodiments, the channel output (r) is provided to a channel estimation block 504, which estimates the MIMO channel and outputs the channel matrix H. In other embodiments, the channel matrix H may have been estimated previously by other means and stored. The channel output r is also provided to a noise-variance estimation block 514, which estimates the noise variance ($\hat{\sigma}^2$) of the channel output r. As shown, an equalization block 406 equalizes the channel output r and the channel matrix H yielding the equalized channel output y and the equalized channel matrix R.

The receiver 500 also has a lattice boundary computation block 510, which receives the channel matrix H and outputs boundary information to the detector 512. For example, the boundary information may correspond to the translated version of corner points or boundary points from the original set of all possible input symbol vectors to the receiver 500. The detector 512 then detects incoming signals based on the equalized channel output y, the equalized channel matrix R and the boundary information. The output of the detector 512 is forwarded to a decoder 514, which decodes the incoming signal. The bounding operation can advantageously reduce the computational burden of the receiver 500 by reducing the number of matrix multiplications (inverse transformations) and subsequent comparisons performed for detection. The blocks of FIG. 5 can be representative of hardware, firmware, and/or software as would be understood by one of skill in the art.

Figure 6:
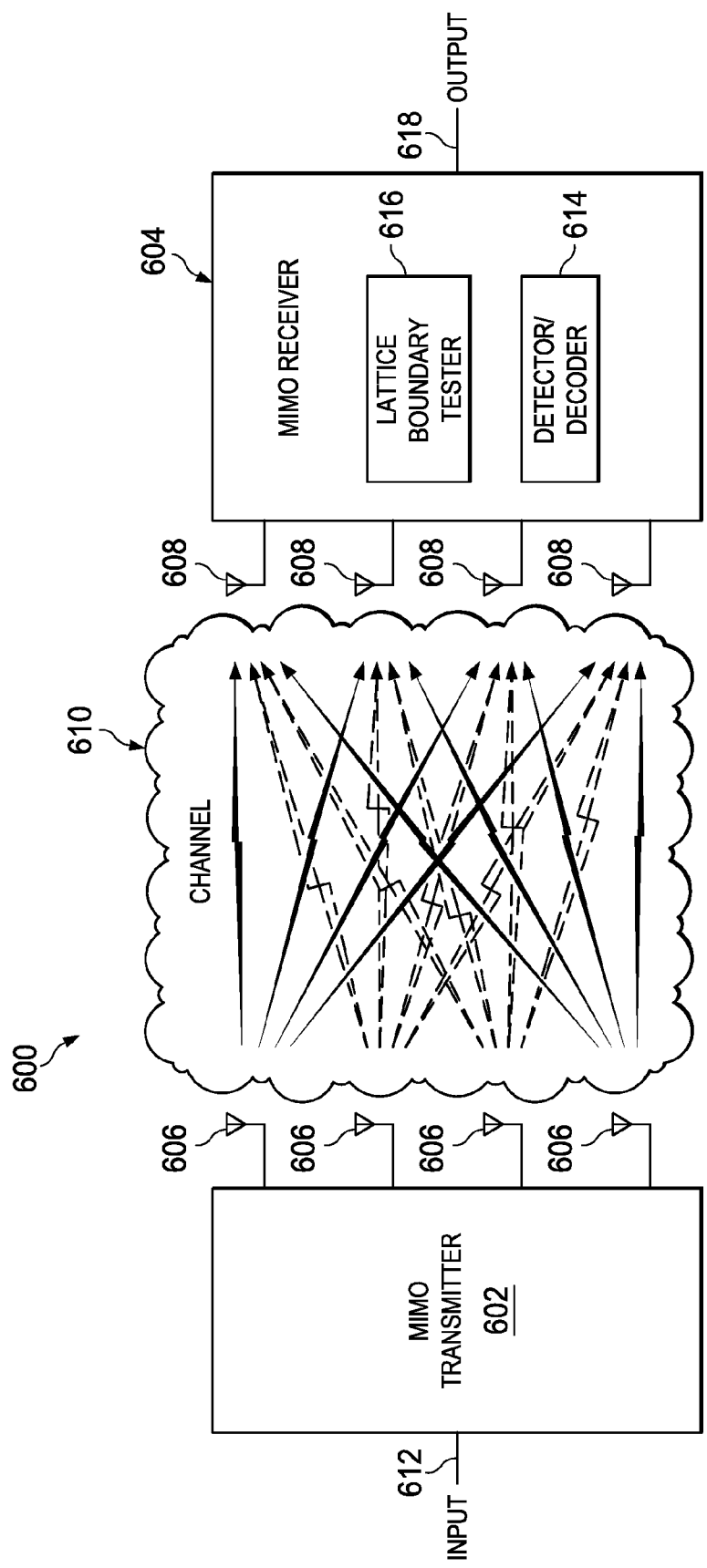
FIG. 6 illustrates a wireless communication system in accordance with embodiments of the disclosure.

FIG. 6 shows an illustrative embodiment of a wireless communication system 600 in accordance with embodiments of the invention. As shown, the wireless communication system 600 comprises a MIMO transmitter 602 having at least one antenna 606 for transmitting radio frequency signals received as input 612. The MIMO transmitter 602 may represent a fixed or portable wireless device, a cellular phone, a personal digital assistant, a wireless modem card, or any other device configured to transmit on a MIMO wireless network. In FIG. 1, a MIMO receiver 604 is configured to receive radio frequency signals transmitted by the MIMO transmitter 602. The MIMO receiver 604 has at least one antenna 608 for receiving transmitted radio frequency signals.

As shown, the MIMO transmitter 602 transmits radio frequency signals to the MIMO receiver 604 through a channel 610. While MIMO systems may greatly increase spectral efficiency, the process of separating signals simultaneously transmitted from multiple antennas 606 may be burdensome for the MIMO receiver 604. To reduce the computational burden, the MIMO receiver 604 comprises a lattice boundary tester 616, which efficiently eliminates candidates determined to be outside the established boundaries of a translated lattice search space. In at least some embodiments, the lattice boundary tester 616 comprises an Application-Specific Integrated Circuit (ASIC) that receives the channel matrix as input and then outputs boundary information to the detector/decoder 614. The boundary information could take a number of forms. In at least some embodiments, the boundary information corresponds to the translated version of corner points or boundary points from the original set of all possible input symbol vectors to the receiver 604.

Figure 7:
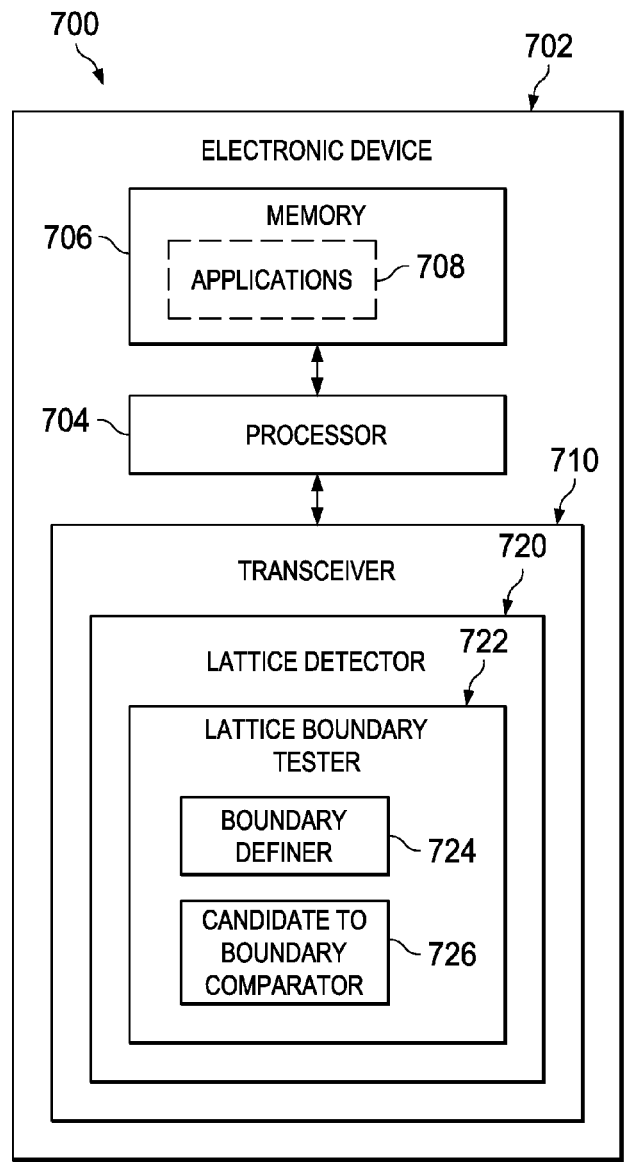
FIG. 7 illustrates an electronic device in accordance with embodiments of the disclosure.

FIG. 7 illustrates an electronic device 702 in accordance with embodiments of the disclosure. Electronic devices such as the device 702 communicate wirelessly (or via a wired connection) using a variety of techniques to prepare, send, receive, and recover data. For example, data preparation techniques may include data scrambling, error correction coding, interleaving, data packet formatting, and/or other techniques. The data to be transmitted is converted into blocks of data (i.e., bits) transmitted as information symbols. Each information symbol is associated with a constellation of complex amplitudes.

If data communication is wireless, the electronic device 702 may employ one or more antennas to "pick up" wireless signals, after which data is recovered by sampling the received signal and decoding each information symbol. To recover data, the electronic device 702 may implement techniques such as signal amplification, digitization, sample rate conversion, data correlation, equalization, demodulation, de-interleaving, de-coding, and/or de-scrambling.

The electronic device 702 may represent any of a variety of devices such as a server, a desktop computer, a laptop computer, a cellular phone, a Personal Digital Assistant (PDA), a smart phone or other electronic devices. In various embodiments, the electronic device 702 receives communications based on an 802.11(a), (g), or (n) protocol, a Worldwide Interoperability of Microwave Access (WiMAX) protocol, an Ultra Wideband (UWB) protocol, a Long-Term Evolution (LTE) protocol or some other communication protocol now known or later developed.

As shown, the electronic device 702 comprises a processor 704 coupled to a memory 706 and a transceiver 710. The memory 706 stores applications 708 for execution by the processor 704. The applications 708 could comprise any known or future application useful for individuals or organizations. As an example, such applications 608 could be categorized as operating systems, device drivers, databases, presentation tools, emailers, file browsers, firewalls, instant messaging, finance tools, games, word processors or other categories. Regardless of the exact nature of the applications 708, at least some of the applications 708 may rely on signals received via the transceiver 710.

To more efficiently process received signals, the transceiver 710 employs a lattice detector 720 having a lattice boundary tester 722. The lattice boundary tester 722 includes a boundary definer 724 and a candidate-to-boundary comparator 726. In at least some embodiments, the boundary definer 724 identifies corner points or boundary points of a translated lattice based on the original (untranslated) set of all possible input symbol vectors to the transceiver 710. Once the boundary is defined, the candidate-to-boundary comparator 726 can compare points (candidates) in the translated space to the boundaries. If a candidate is outside the established boundaries, the candidate is presumed to be invalid and further processing for the candidate (e.g., inverse transformation and comparison to points of the original lattice) can be omitted. If a candidate is within the established boundaries, the lattice detector 720 may perform the inverse transformation and comparison steps to guarantee the candidate truly corresponds to a point in the original lattice.

Figure 8:
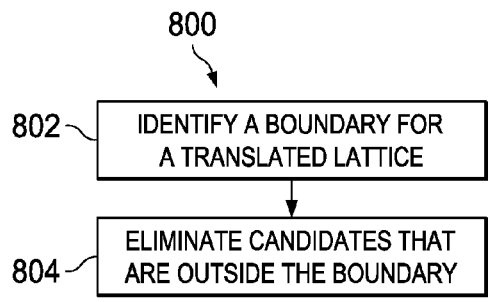
FIG. 8 illustrates a wireless signal detection method in accordance with embodiments of the disclosure.

FIG. 8 illustrates a wireless signal detection method 800 in accordance with embodiments of the disclosure. The method 800 comprises identifying a boundary for a translated lattice (block 802). The method 800 also comprises eliminating candidates that are outside the boundary (block 804). In at least some embodiments, identifying the boundary involves determining corner points or boundary points of a transformed lattice. If a candidate is outside the established boundaries, the candidate is presumed to be invalid and further processing for the candidate (e.g., inverse transformation and comparison to points of the original lattice) can be omitted. Thus, the method 800 can reduce the computational burden of wireless signal detection.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A wireless communication system, comprising:
   a transmitter that transmits a Multiple-input Multiple-Output (MIMO) signal over a communication channel;
   a receiver that receives the MIMO signal as an output of the communication channel,
   a lattice detector comprising:
   a boundary definer which establishes a hypercube boundary for a transformed integer lattice, wherein said integer lattice defines discrete subgroup of a space spanning a real vector space generated from a basis with integer coefficients; and
   a candidate-to-boundary comparator which checks whether received candidate points are within a transformed integer lattice hypercube boundary, wherein the system eliminates candidates outside the established boundary.

2. The wireless communication system of claim 1 wherein the hypercube boundary is defined by at least one corner.

3. The wireless communication system of claim 1 wherein the receiver performs an inverse transformation only for candidates determined to be within the established hypercube boundary.

4. The wireless communication system of claim 3 wherein, after each inverse transformation, the receivercandidate-to-boundary comparator compares candidates to points in an original integer lattice.

5. The wireless communication system of claim 1, wherein the receiver implements at least one detector that relies on the hypercube boundary, the at least one detector selected from the group consisting of a Minimum Mean-Squared Error (MMSE) Lattice-Reduction Aided (LR) Multiple-input Multiple-Output (MIMO) detector, a Soft Interference Cancellation (SIC) LR MIMO detector, and a zero-forcing (ZF) LR MIMO detector.

6. An electronic device, comprising:
   a processor; and
   a receiver coupled to the processor, the receiver comprising a lattice detector comprising:
   a boundary definer for identifying boundary points;
   a candidate-to-boundary comparator which checks whether received candidate points are within a transformed integer lattice hypercube boundary,
   wherein said integer lattice defines discrete subgroup of a space spanning a real vector space generated from a basis with integer coefficients.

7. The electronic device of claim 6 wherein the receiver eliminates candidate points determined to be outside the transformed integer lattice hypercube boundary.

8. The electronic device of claim 6 wherein the boundary definer identifies at least one corner to establish the transformed integer lattice hypercube boundary.

9. The electronic device of claim 6 wherein the receiver performs an inverse transformation only for candidates determined to be within the transformed integer lattice hypercube boundary.

10. The electronic device of claim 9 wherein, after each inverse transformation, the candidate-to-boundary comparator compares candidates to points in an original integer lattice.

11. A method for wireless signal detection, comprising:
    identifying a plurality of corners of a hypercube boundary for a transformed integer lattice, wherein said integer lattice defines discrete subgroup of a space spanning a real vector space generated from a basis with integer coefficients; and
    eliminating candidates that are outside the hypercube boundary.

12. The method of claim 11 further comprising performing an inverse transformation only for candidates determined to be within the hypercube boundary.

13. The method of claim 12 further comprising, after each inverse transformation, compares candidates to points in an original integer lattice.

14. The method of claim 11 further comprising reducing an integer lattice before identifying the hypercube boundary.

* * * * *